United States Patent
Imai

(10) Patent No.: US 9,195,115 B2
(45) Date of Patent: Nov. 24, 2015

(54) IMAGE PROJECTION DEVICE, IMAGE PROTECTION METHOD, DISTANCE MEASURING DEVICE AND DISTANCE MEASURING METHOD

(75) Inventor: Hiroshi Imai, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 887 days.

(21) Appl. No.: 13/501,990

(22) PCT Filed: Oct. 4, 2010

(86) PCT No.: PCT/JP2010/067340
§ 371 (c)(1),
(2), (4) Date: Apr. 13, 2012

(87) PCT Pub. No.: WO2011/046035
PCT Pub. Date: Apr. 21, 2011

(65) Prior Publication Data
US 2012/0200832 A1  Aug. 9, 2012

(30) Foreign Application Priority Data

Oct. 15, 2009  (JP) ................................. 2009-238087

(51) Int. Cl.
*G03B 21/14* (2006.01)
*G03B 3/00* (2006.01)
(Continued)

(52) U.S. Cl.
CPC .. *G03B 3/00* (2013.01); *G02B 3/08* (2013.01); *G02B 15/00* (2013.01); *G02B 27/104* (2013.01); *G02B 27/145* (2013.01); *G02B 27/48* (2013.01); *G03B 21/00* (2013.01)

(58) Field of Classification Search
CPC . H04N 9/3129; H04N 9/3161; H04N 9/3197; G02B 27/48; G03B 3/00
USPC ............ 353/30, 34, 37, 38, 85, 94, 101, 102; 359/224.1, 290, 666, 724, 578, 834, 359/846, 859; 348/743–748
See application file for complete search history.

(56) References Cited

U.S. PATENT DOCUMENTS

2002/0051643 A1* 5/2002 Nakashita .................... 396/429
2003/0081137 A1* 5/2003 Yamazaki .................... 348/354
(Continued)

FOREIGN PATENT DOCUMENTS

CN  1077293 C  1/2002
CN  1790094 A  6/2006
(Continued)

OTHER PUBLICATIONS

Search Report dated Dec. 17, 2013, issued by the State Intellectual Property Office of the P.R.C. in corresponding Chinese Application No. 201080055747.7.

(Continued)

*Primary Examiner* — Sultan Chowdhury
(74) *Attorney, Agent, or Firm* — Sughrue Mion, PLLC

(57) ABSTRACT

An image projection device includes: a variable-focus lens (2) in which focal length can be changed; scanning means (3) that scans a projection surface (12) by means of a light beam that is condensed by the variable-focus lens (2); distance-measuring means (9) that measures the distance from the variable-focus lens (2) to the projection surface (12); and control means (4) that controls the variable-focus lens (2) such that the focal length of the variable-focus lens (2) is greater than the distance measured by means of the distance-measuring means (9).

16 Claims, 15 Drawing Sheets

(51) Int. Cl.
*G02B 3/08* (2006.01)
*G02B 15/00* (2006.01)
*G02B 27/10* (2006.01)
*G02B 27/14* (2006.01)
*G02B 27/48* (2006.01)
*G03B 21/00* (2006.01)

(56) References Cited

U.S. PATENT DOCUMENTS

| | | |
|---|---|---|
| 2009/0096999 A1 | 4/2009 | Frahm et al. |
| 2009/0207466 A1 | 8/2009 | Bucklay |
| 2009/0231550 A1* | 9/2009 | Itoh et al. ............ 353/31 |
| 2010/0020291 A1* | 1/2010 | Kasazumi et al. ............ 353/38 |
| 2010/0053361 A1* | 3/2010 | Sugita et al. ............ 348/222.1 |
| 2010/0214540 A1* | 8/2010 | Sajadi et al. ............ 353/101 |
| 2010/0296065 A1* | 11/2010 | Silverstein et al. ............ 353/38 |
| 2010/0315605 A1 | 12/2010 | Arita |

FOREIGN PATENT DOCUMENTS

| | | |
|---|---|---|
| CN | 201314977 Y | 9/2009 |
| JP | 2003-21800 A | 1/2003 |
| JP | 2007-121538 A | 5/2007 |
| JP | 2008262029 A | 10/2008 |
| JP | 2009-186678 A | 8/2009 |
| JP | 2009-193008 A | 8/2009 |
| JP | 2011-128636 A | 6/2011 |

OTHER PUBLICATIONS

Communication dated Aug. 5, 2014 issued by the Japanese Patent Office in counterpart Japanese application No. 2011-536099.

* cited by examiner

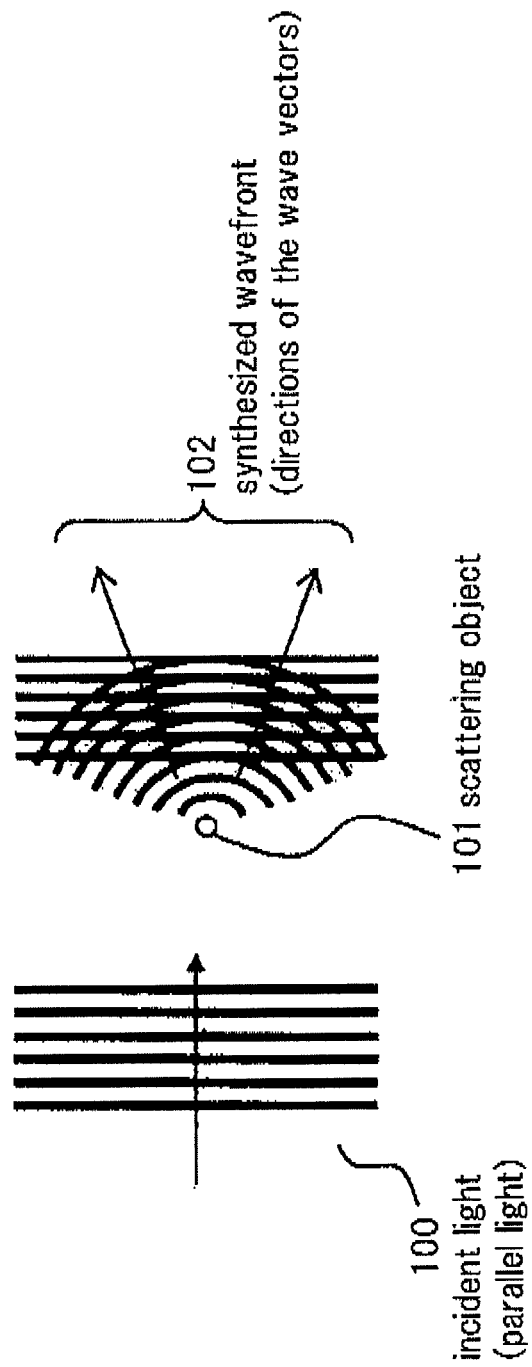

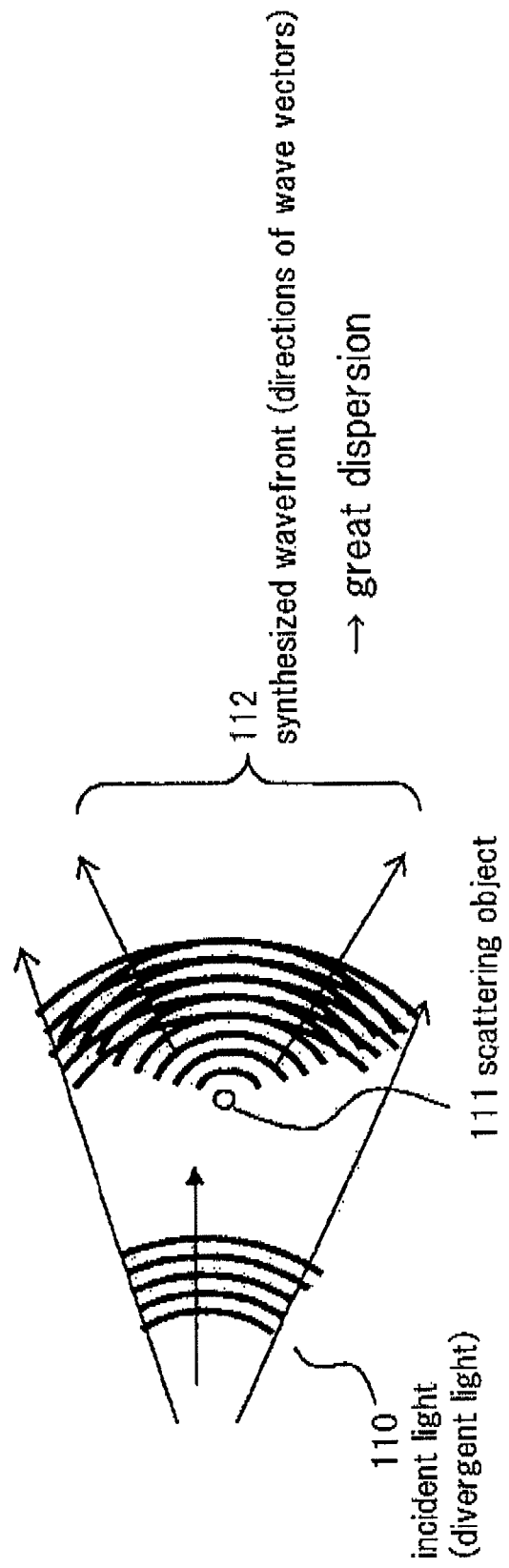

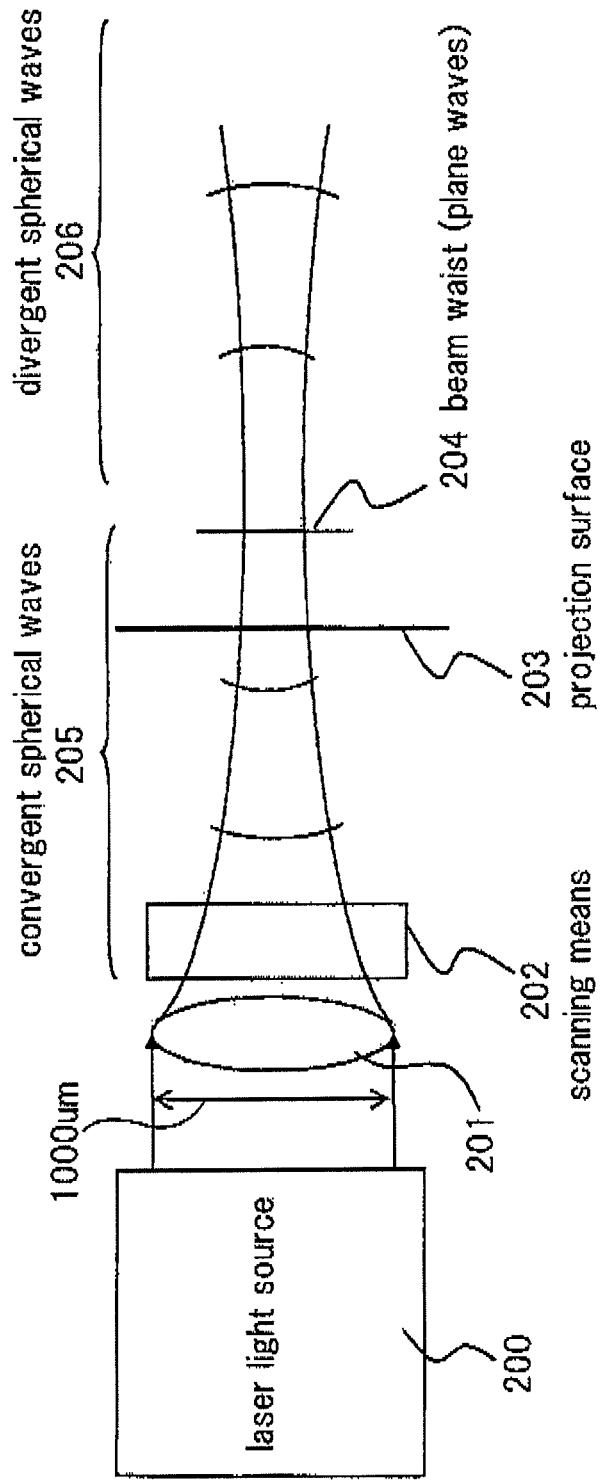

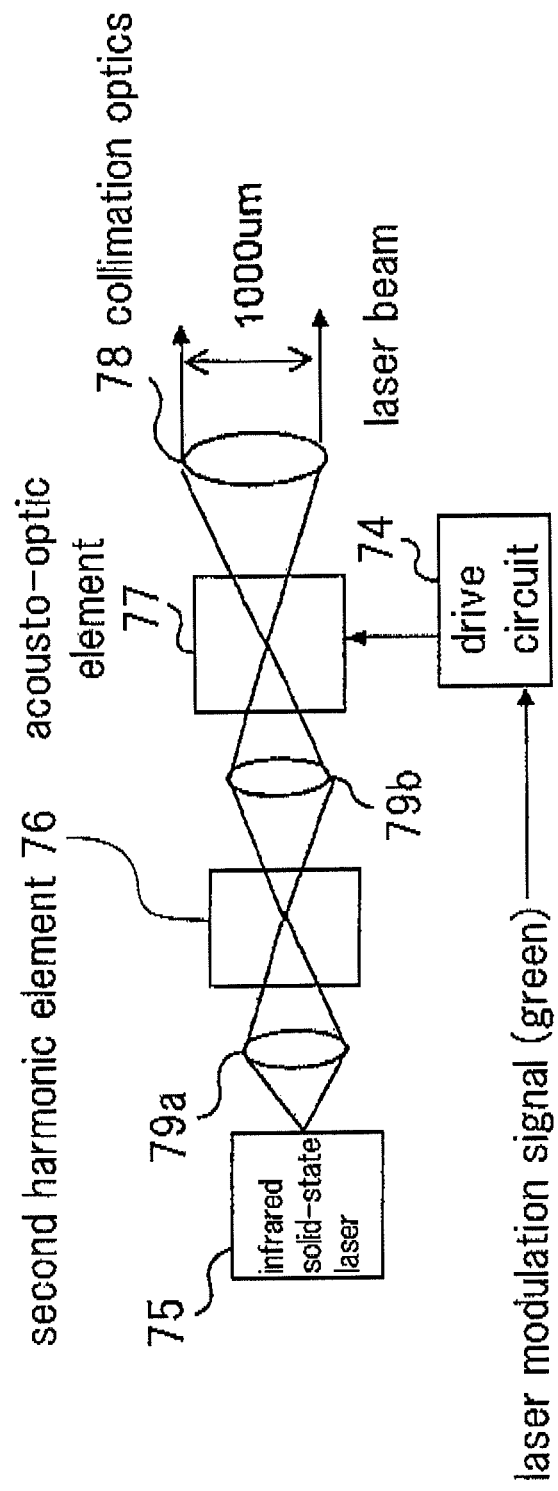

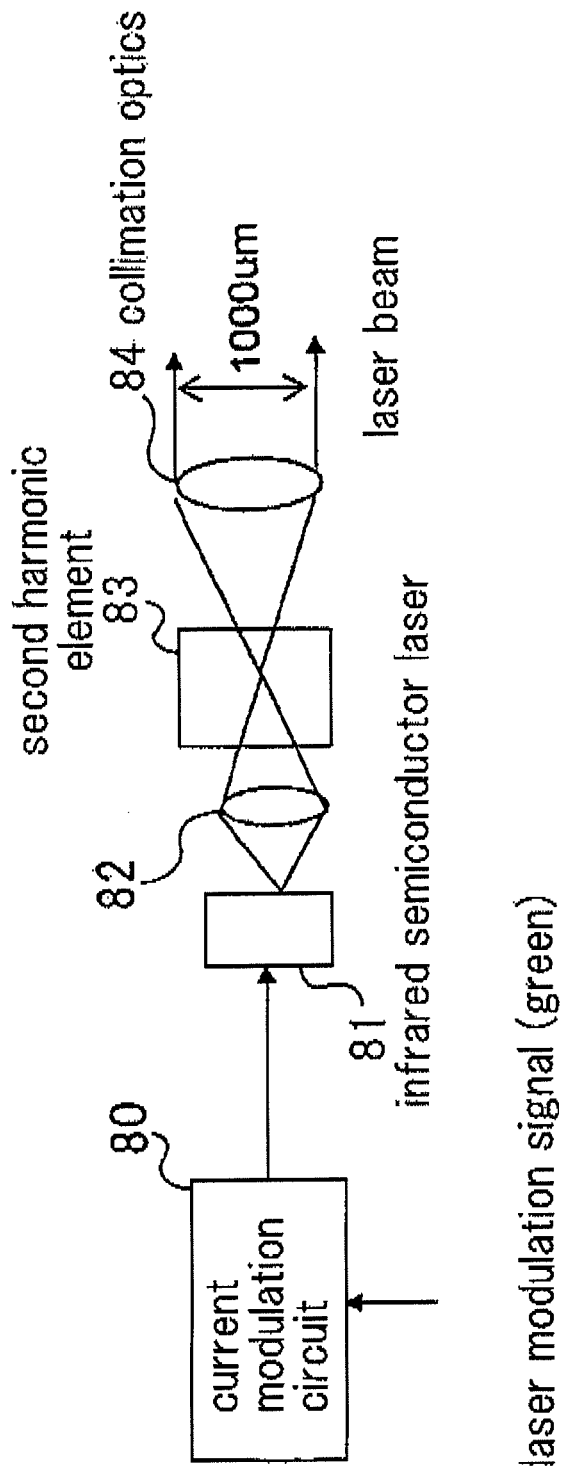

IMAGE PROJECTION DEVICE, IMAGE PROTECTION METHOD, DISTANCE MEASURING DEVICE AND DISTANCE MEASURING METHOD

CROSS REFERENCE TO RELATED APPLICATIONS

This application is a National Stage of International Application No. PCT/JP2010/067340 filed Oct. 4, 2010, claiming priority based on Japanese Patent Application No. 2009-238087, filed Oct. 15, 2009, the contents of all of which are incorporated herein by reference in their entirety.

TECHNICAL FIELD

The present invention relates to image projection device that scans a projection surface by means of a light beam such as a Gaussian beam (for example, a laser beam) to display an image.

BACKGROUND ART

Patent Document 1 describes an image display device that displays an image by scanning the projection surface by a light beam that is modulated according to a video signal. This image display device includes condensing optics that condense the light beam from a is light source and a scanning unit provided with a reflecting mirror that reflects the light beam that has been condensed by these condensing optics toward the projection surface.

The condensing optics form a beam waist at a position farther from the reflecting mirror than the midpoint between the reflecting mirror and the projection surface. In this way, the beam radius on the reflecting mirror of the scanning unit can be reduced, and moreover, enlargement of the beam radius on the projection surface can be suppressed, thereby enabling a more compact reflecting mirror and higher-definition image display.

LITERATURE OF THE PRIOR ART

Patent Documents

Patent Document 1: Japanese Unexamined Patent Application Publication No. 2007-121538

SUMMARY OF THE INVENTION

When the projection surface is scanned by a laser beam to display an image, noise occurs in the form of spots referred to as speckle that originate from the coherence of the laser beam. Speckle is a distraction when viewing a displayed image and detracts from image quality.

In the image display device described in Patent Document 1, a beam waist is formed between the reflecting mirror of the scanning unit and the projection surface at a position that is farther from the reflecting mirror than the midpoint. In this configuration as well, the above-described speckle also occurs, resulting in a decrease of image quality.

It is an object of the present invention to provide an image projection device and image projection method that can reliably reduce speckle and thus solve the above-described problem.

To achieve the above-described object, the image projection device according to one aspect of the present invention includes:

a variable-focus lens in which focal length can be changed;
scanning means that scans the projection surface by a light beam that is condensed by the variable-focus lens;
distance measuring means that measures the distance from the variable-focus lens to the projection surface; and
control means that controls the variable-focus lens such that the focal length of the variable-focus lens is greater than the distance measured by the distance-measuring means.

The image projection method according to an aspect of the present invention is an image projection method for displaying an image by scanning the projection surface by a light beam that has been condensed by a variable-focus lens in which the focal length can be changed, the image projection method including:
measuring the distance from the variable-focus lens to the projection surface and setting a focal length in the variable-focus lens that is greater than the distance that was measured.

BRIEF DESCRIPTION OF THE DRAWINGS

FIG. 1A is a schematic view showing the state of a synthesized wavefront that occurs when parallel light is irradiated upon a scattering object.

FIG. 1B is a schematic view showing the state of a synthesized wavefront that occurs when divergent light is irradiated upon a scattering object.

FIG. 2A is a schematic view for describing the state of a wavefront when the projection surface is scanned by a condensed beam.

FIG. 13A is a block diagram showing the configuration of the green laser light source that is used in the image projection device shown in FIG. 11.

FIG. 13B is a block diagram showing another configuration of the green laser light source that is used in the image projection device shown in FIG. 11.

EXPLANATION OF REFERENCE NUMBERS

Figure 1C:
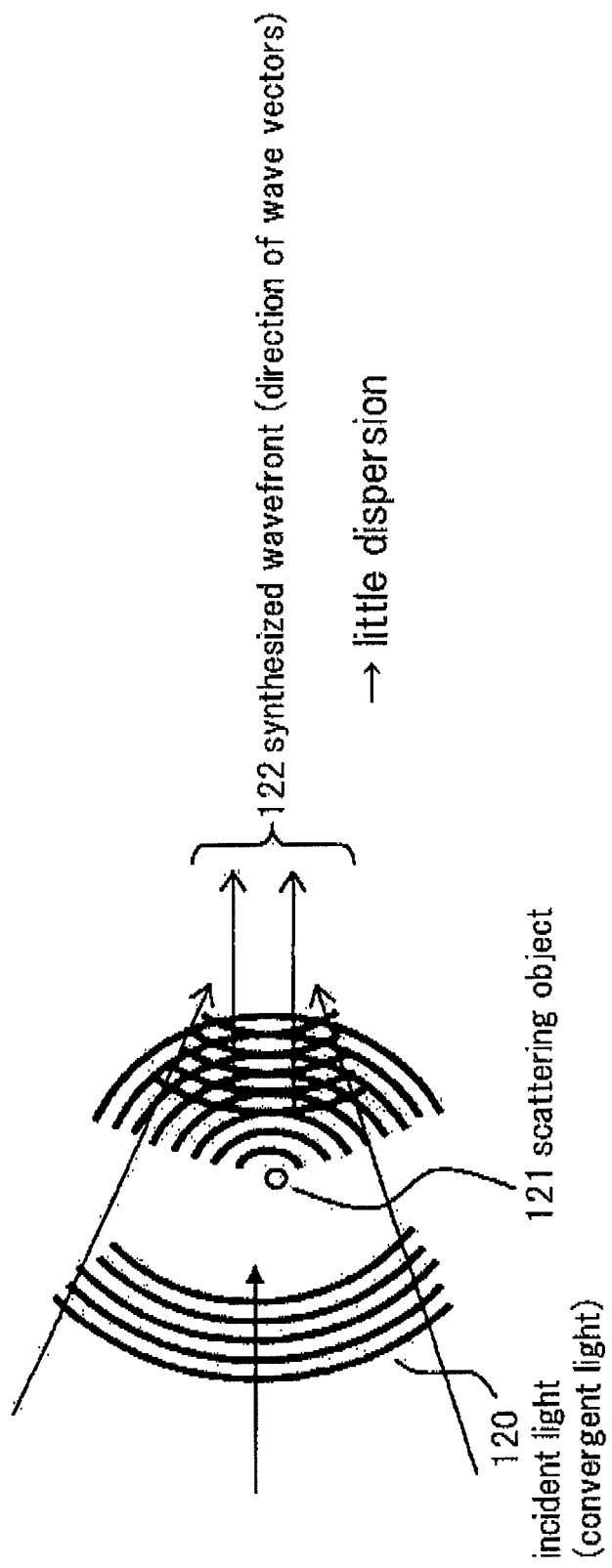
FIG. 1C is a schematic view showing the state of a synthesized wavefront that occurs when convergent light is irradiated upon a scattering object.

2 variable-focus lens
3 scanning means
4 control means
5 image-pickup means
5a image sensor
5b image-pickup lens
6 image memory
7 speckle contrast calculation means
7a image average calculation means
7b image standard deviation calculation means
7c dividing means
8 look-up table means
9 distance-measuring means

BEST MODE FOR CARRYING OUT THE INVENTION

The inventors of the present application analyzed causes of the occurrence of speckle and gained the new information described hereinbelow.

FIG. 1A is a schematic view showing the state of a synthesized wavefront that is produced when parallel light is irradiated upon a scattering object. When parallel light 100 reaches scattering object 101, secondary spherical waves are produced at scattering object 101. The directions of the wave vectors that are prescribed by the synthesized wavefront of these secondary spherical waves and the wavefront of parallel light 100 become divergent directions, and the dispersion of wave vectors becomes great. Speckle increases with increase in the dispersion of wave vectors.

FIG. 1B is a schematic view showing the state of the synthesized wavefront that is produced when divergent light is irradiated upon a scattering object. When divergent light 110 reaches scattering object 111, secondary spherical waves are produced at scattering object 111. The directions of wave vectors prescribed by the synthesized wavefront of these secondary spherical waves and the wavefront of divergent light 110 become directions that diverge (disperse) even more greatly than the case shown in FIG. 1A. The dispersion of wave vectors in this case is even greater than the case shown in FIG. 1A, and speckle is consequently even greater.

FIG. 1C is a schematic view showing the state of the synthesized wavefront that is produced when convergent light is irradiated upon a scattering object. When convergent light 120 reaches scattering object 121, secondary spherical waves are produced at scattering object 121. The wave vectors that are prescribed by the synthesized wavefront of these secondary spherical waves and the wavefront of convergent light 120 are substantially parallel. The dispersion of wave vectors in this case is less than the cases shown in FIG. 1A and FIG. 1B, and as a result, there is less speckle.

As can be seen from FIGS. 1A-1C, the projection surface (scattering object) is preferably scanned by convergent light.

However, in an optical scanning system in which laser light is condensed and the projection surface then scanned by the condensed beam, cases occur in which, depending on the distance from the system to the projection surface, the beam that is projected upon the projection surface does not become convergent light.

FIG. 2A is a schematic view of the wavefront when the projection surface is scanned by a condensed beam.

In the system shown in FIG. 2A, laser light from laser light source 200 is condensed by condenser lens 201. Scanning means 202 scans projection surface 203 by the beam from condenser lens 201. The beam emitted from condenser lens 201 is propagated as convergent spherical waves 205 and then changes in state from convergent spherical waves 205 to divergent spherical waves 206 with the position at which beam waist 204 forms as the boundary.

When projection surface 203 is located toward the side of condenser lens 201 from beam waist 204, projection surface 203 is scanned by a beam of convergent spherical waves 205. In this case, projection surface 203 is scanned by convergent light, whereby speckle can be reduced.

In contrast, when projection surface 203 is positioned farther from condenser lens 201 than beam waist 204, projection surface 203 is scanned by a beam of divergent spherical waves 206. In this case, projection surface 203 is scanned by divergent light, and speckle therefore becomes difficult to reduce.

Figure 2B:
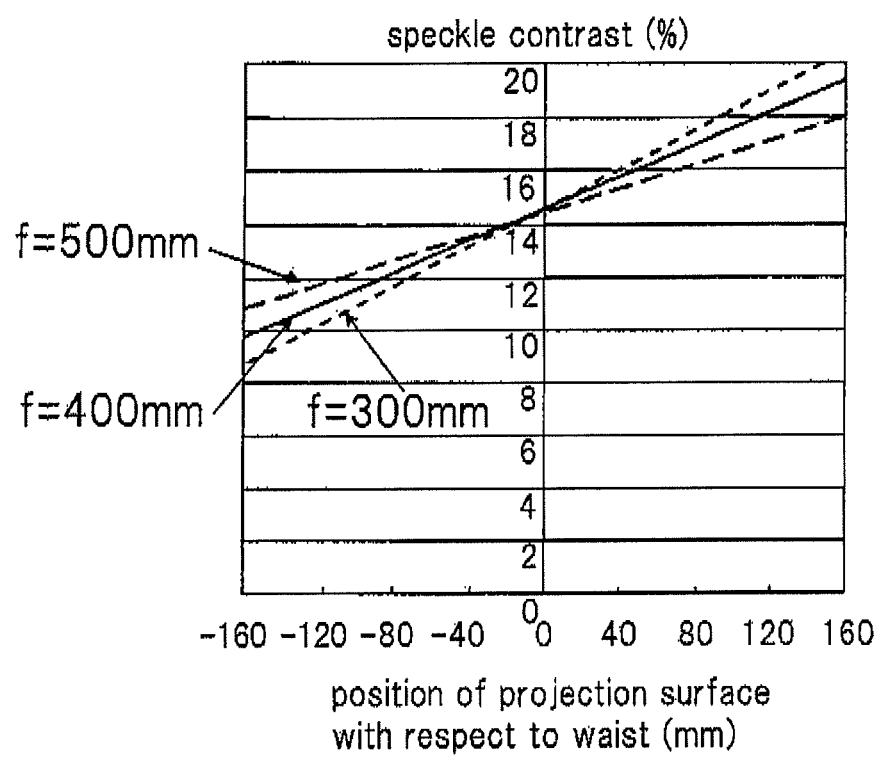
FIG. 2B is a characteristics chart showing the change in speckle contrast when the projection surface is moved back and forth with respect to the beam waist.

FIG. 2B shows the change in speckle contrast (%) when a projection surface is moved back and forth with the position of the beam waist as the reference. Speckle contrast indicates the degree of speckle, and more specifically, is a value for a speckle image that is obtained by dividing the standard deviation value of the value of a picture element by the average value of each picture element. In FIG. 2B, the horizontal axis indicates the distance (mm) from the beam waist. The position of the beam waist is assumed to be "0" with the side of condenser lens 201 being indicated by minus and the opposite side being indicated by plus. In addition, the change of speckle contrast is shown by a broken line (short), a solid line, and a broken line (long) for cases in which the focal length of condenser lens 201 is 300 mm, 400 mm, and 500 mm, respectively.

As can be seen from FIG. 2B, when the projection surface is positioned on the side of the condenser lens from the position of the beam waist, the speckle contrast is reduced. In this case, the speckle contrast decreases with increasing proximity of the projection surface to the condenser lens. The speckle contrast decreases as the focal length decreases.

On the other hand, speckle contrast increases when the projection surface is positioned on the side farther from the condenser lens than the position of the beam waist. In this case, speckle contrast increases as the projection surface becomes increasingly remote from the position of the beam waist. Speckle contrast increases with decreasing focal length.

Accordingly, in an optical scanning system in which a projection surface is scanned by laser light (Gaussian beam), the projection surface must be positioned closer to the condenser lens than the position of the beam waist in order to decrease speckle contrast.

In addition, when the beam radius on the projection surface is large, resolution decreases. Accordingly, a projection surface is preferably positioned in the vicinity of the beam waist in order to limit a decrease of resolution. More specifically, taking the beam waist as a reference, the projection surface is preferably positioned within a range prescribed by the Rayleigh length from the reference (a range of distances in which the beam radius is a multiple of $\sqrt{2}$).

However, because the projection surface is arranged at any position by the user, depending on the position of arrangement of the projection surface, the beam waist is sometimes positioned before the projection surface. In such cases, the effect of reducing speckle contrast by means of convergent light cannot be obtained.

A technique that can reliably obtain the above-described effect of reducing speckle by means of convergent light has as yet not been proposed.

Image projection devices that enable reliable scanning of a projection surface by convergent light regardless of the position of the projection surface are next described as exemplary embodiments of the present invention.

First Exemplary Embodiment

Figure 3:
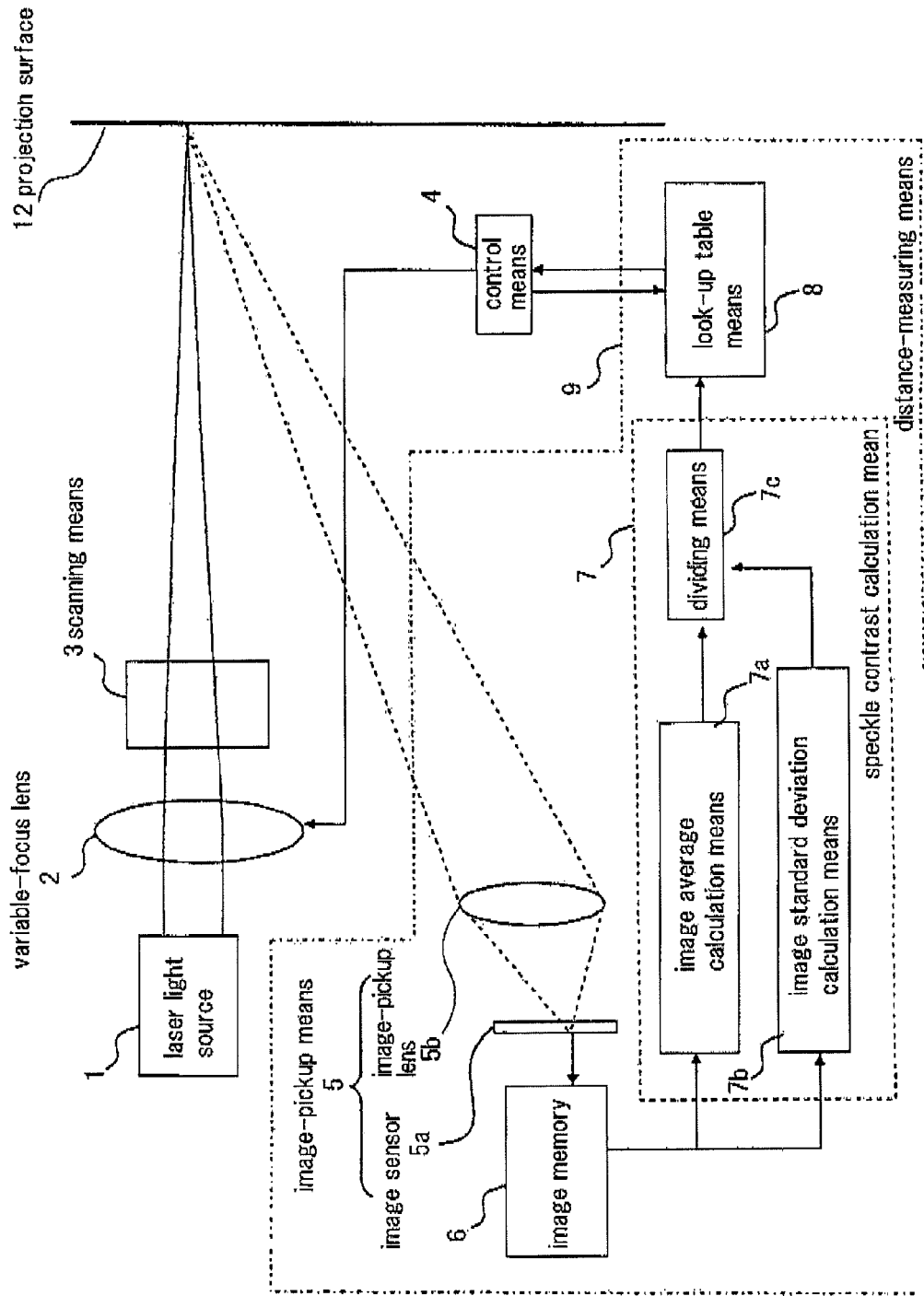
FIG. 3 is a schematic view showing the configuration of the principal parts of the image projection device that is the first exemplary embodiment of the present invention.

FIG. 3 is a schematic view showing the configuration of the principal parts of an image projection device that is the first exemplary embodiment of the present invention.

Referring to FIG. 3, the image projection device includes laser light source 1, variable-focus lens 2, scanning means 3, control means 4, and distance-measuring means 9. Scanning means 3 scans projection surface 12 by a light beam that is condensed by variable-focus lens 2 in which the focal length can be changed. Distance-measuring means 9 measures the distance from variable-focus lens 2 to projection surface 12. Control means 4 controls variable-focus lens 2 such that the focal length of variable-focus lens 2 is longer than the distance measured in distance-measuring means 9.

Variable-focus lens 2, scanning means 3, control means 4, and distance-measuring means 9 are next described in greater detail.

Variable-focus lens 2 and scanning means 3 are arranged in that order along the direction of the progression of laser light from laser light source 1. Variable-focus lens 2 is configured such that the focal length changes according to a control signal from control means 4. The range of variable focal lengths is, for example, from 50 mm to infinity.

Figure 4:
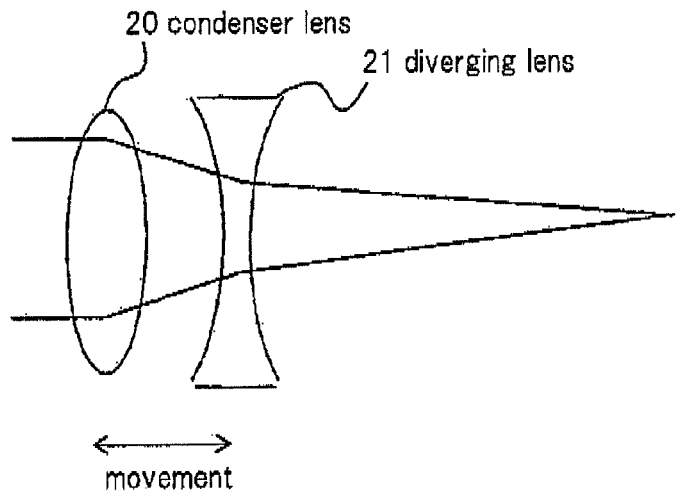
FIG. 4 is a schematic view showing an example of a variable-focus lens of the image projection device shown in FIG. 3.

FIG. 4 shows an example of variable-focus lens 2. Referring to FIG. 4, variable-focus lens 2 is made up of a zoom lens composed of condenser lens 20 and diverging lens 21. In this variable-focus lens 2, the distance between condenser lens 20 and diverging lens 21 changes according to the control signal from control means 4, whereby the focal length changes.

Figure 5A:
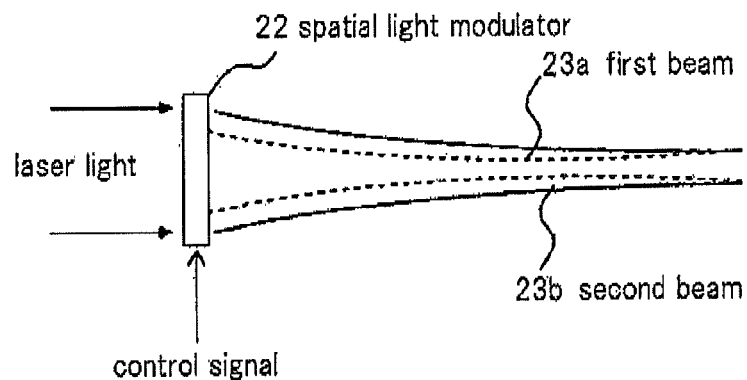
FIG. 5A is a schematic view showing another example of the variable-focus lens of the image projection device shown in FIG. 3.

FIG. 5A shows another example of variable-focus lens 2. Referring to FIG. 5A, variable-focus lens 2 is made up of spatial light modulator 22 such as a matrix liquid crystal panel. Spatial light modulator 22 forms an image that corresponds to a Fresnel zone plate according to the control signal from control means 4.

A Fresnel zone plate is made up of a plurality of concentric circular rings in which transparent rings and opaque rings are alternately arranged. Fresnel zone plates include phase-type Fresnel zone plates in which the phase difference of each of the transparent rings and opaque rings is 0 and $\pi$, respectively, and transmissive-type Fresnel zone plates in which the transmittance of a transparent ring and the transmittance of an opaque ring are 100% and 0%, respectively.

Figure 5B:
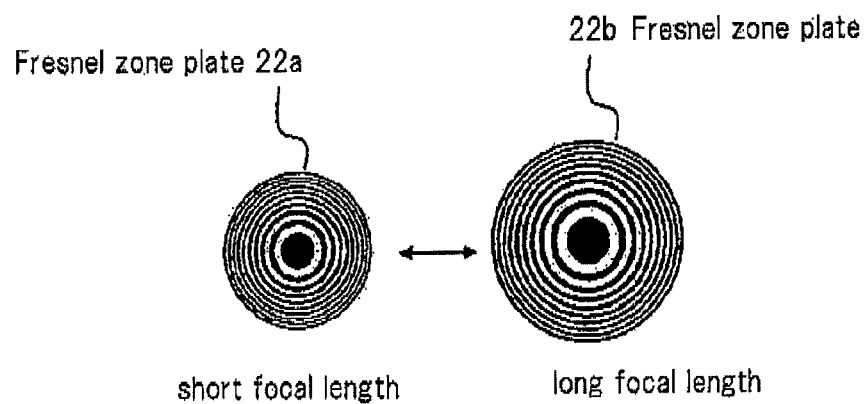
FIG. 5B is a schematic view showing an example of a pattern of a Fresnel zone plate that is formed in the variable-focus lens shown in FIG. 5A.

As shown in FIG. 5B, the focal length of a Fresnel zone plate is determined by the spacing between transparent rings and opaque rings and the width of the rings. In spatial light modulator 22, the Fresnel zone plate pattern changes in accordance with the control signal from control means 4, whereby the focal length changes continuously or in steps. When the Fresnel zone plate pattern in which the focal length is short as shown in FIG. 5B is displayed, first beam 23a having a large converging angle is obtained as shown in FIG. 5A. When a Fresnel zone plate pattern in which the focal length is long as shown in FIG. 5B is displayed, second beam 23b having a small converging angle is obtained as shown in FIG. 5A.

Apart from the example described above, components such as a varifocal lens, a varifocal mirror, or a liquid crystal lens can also be used as variable-focus lens 2.

A varifocal lens is a component in which a liquid fills a lens-shaped space and the pressure of the liquid that fills the space changes according to the control signal from control means 4. This change in pressure changes the shape of the lens, whereby the focal length changes.

A varifocal mirror is a component in which the mirror shape changes due to a force such as electrostatic force, magnetism, or pressure. The mirror shape is changed by electrostatic force (or magnetism or pressure) that accords with the control signal from control means 4, whereby the focal length also changes.

A liquid crystal lens is a component in which liquid crystal is enclosed in a lens-shaped space. The magnitude of voltage applied to the liquid crystal changes according to the control signal from control means 4, whereby the refractive index in the lens-shaped space changes and the focal length changes.

Again referring to FIG. 3, distance-measuring means 9 includes image-pickup means, image memory 6, speckle contrast calculation means 7, and look-up table means 8.

Image-pickup means 5 is a component that captures the image displayed on projection surface 12 and includes image sensor 5a and image-pickup lens 5b. As an example of image-pickup lens 5b, a lens is used in which the focal length is 18 mm, the pupil diameter is 2.25 mm, and the f-number is 8. By means of such a lens, the resolution limit for light of a wavelength of 532 nm is 5 µm.

Image sensor 5a is made up of a two-dimensional area sensor of which a CMOS (Complementary Metal Oxide Semiconductor) sensor or a CCD (Charge Coupled Device) sensor is representative. In this case, image sensor 5a is made up of a CMOS sensor of, for example, 1000 pixels×1000 pixels and having a picture element pitch of, for example, 2.2 µm. Making the pixel pitch no greater than one-half the resolution limit of image-pickup lens 5b suppresses the effect of diffraction upon an image.

A one-dimensional line sensor can be used as image sensor 5a. When a one-dimensional line sensor is used, a cylindrical lens may be used as image-pickup lens 5b.

The output of image sensor 5a is supplied to image memory 6. The image data that are supplied from image sensor 5a are stored in image memory 6. The image data that have been stored in image memory 6 are supplied to speckle contrast calculation means 7.

Speckle contrast calculation means 7 is a component that calculates speckle contrast based on image data (speckle image data) from image memory 6 and includes image average calculation means 7a, image standard deviation calculation means 7b, and dividing means 7c. The image data from image memory 6 is supplied to image average calculation means 7a and image standard deviation calculation means 7b.

Image average calculation means 7a calculates the average value of the value of each pixel of image data from image memory 6. The output (average value) from image average calculation means 7a is supplied to dividing means 7c.

Image standard deviation calculation means 7b derives the standard deviation for the value of each pixel of the image data from image memory 6 and supplies this standard deviation value to dividing means 7c.

Dividing means 7c divides the value of the standard deviation that was supplied from image standard deviation calculation means 7b by the average value that was supplied from image average calculation means 7a and supplies the calculation result to look-up table means 8 as the value of speckle contrast.

Look-up table means 8 holds, for each focal length of variable-focus lens 2, characteristic data that indicate the change in speckle contrast when the projection surface moves back and forth with the position of the beam waist as reference. For example, look-up table means 8 holds the characteristic data shown in FIG. 2B. Look-up table means 8 refers to the characteristic data that are held, and based on the value of speckle contrast that was supplied from dividing means 7c, calculates the distance from variable-focus lens 2 to projection surface 12.

The calculation result of the distance realized by look-up table means 8 is supplied from distance-measuring means 9 to control means 4. Control means 4 controls variable-focus lens 2 such that the focal length of variable-focus lens 2 is greater than the distance that was supplied from distance-measuring means 9.

The operation of the image projection device of the present exemplary embodiment is next described.

The image projection device of the present exemplary embodiment features control of variable-focus lens 2 such that the beam waist of the light beam from variable-focus lens 2 is positioned more deeply than projection surface 12, other controls being basically the same as the controls of the existing image projection device. As a result, the characteristic control (focal length setting method) is described hereinbelow and explanation of other controls is omitted.

Figure 6:
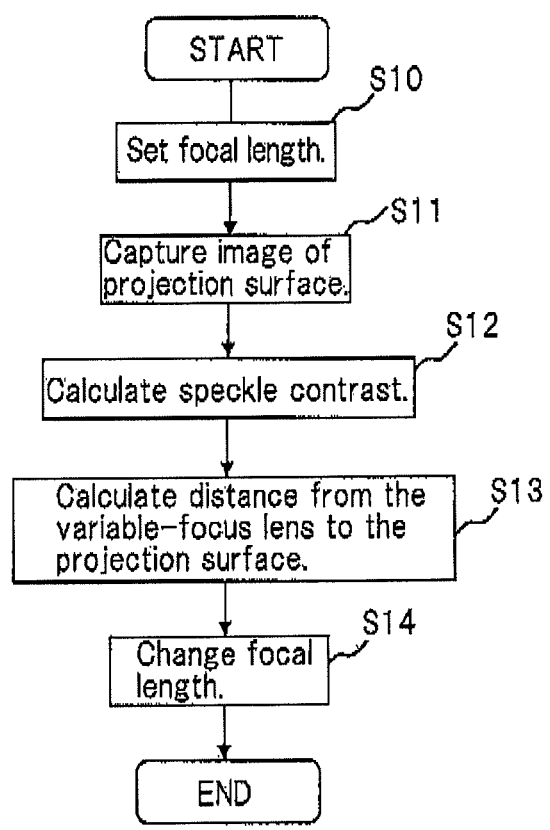
FIG. 6 is a flow chart for describing the operation of the image projection device shown in FIG. 3.

FIG. 6 is a flow chart showing the procedures of the method of setting focal length of variable-focus lens 2.

Referring to FIG. 6, control means 4 first sets the initial value of the focal length of variable-focus lens 2 and reports this set value to distance-measuring means 9 (Step S10). Image-pickup means 5 next captures the image that is displayed on the projection surface (Step S11). The captured image data are supplied to speckle contrast calculation means 7 by way of image memory 6.

Speckle contrast calculation means 7 next calculates the speckle contrast based on the image data that were captured in Step S11 (Step S12). In the process of calculating this speckle contrast, image average calculation means 7a calculates the average value of the values of each pixel of image data and image standard deviation calculation means 7b calculates the standard deviation for the values of each pixel of image data. Dividing means 7c then divides the value of the standard deviation that was calculated in image standard deviation calculation means 7b by the average value that was calculated in image average calculation means 7a and supplies the calculation result as the value of the speckle contrast.

When the speckle contrast is calculated, look-up table means 8 identifies the characteristic data that correspond to the value (initial value) of the focal length that was supplied from control means 4 in Step S10 from among the characteristic data that are held. Look-up table means 8 further refers to the characteristic data that was identified and obtains the distance from variable-focus lens 2 to projection surface 12 based on the value of speckle contrast that was calculated in Step S12.

Finally, control means 4 controls variable-focus lens 2 such that the focal length of variable-focus lens 2 is greater than the distance that was calculated in Step S13 (Step S14).

For example, the above-described processes of Steps S13 and S14 are carried out by the following procedure when look-up table means 8 holds the characteristic data shown in FIG. 2B, the initial value of the focal length of variable-focus lens 2 is 300 mm, and the value of speckle contrast that is calculated by speckle contrast calculation means 7 is 20%.

Look-up table means 8 first obtains the characteristic data that the focal length is 300 mm from the characteristic data shown in FIG. 2B. Look-up table means 8 next refers to the characteristic data that were acquired (focal length 300 mm) and identifies the projection surface position with respect to the beam waist that corresponds to a speckle contrast value of 20%. In this case, it can be ascertained that projection surface 12 is at a position separated by 150 mm in the direction that diverges from the position of the beam waist. From this result, it can be seen that the distance from variable-focus lens 2 to projection surface 12 is 450 mm 300 mm+150 mm).

Because the distance from variable-focus lens 2 to projection surface 12 is 450 mm, control means 4 controls variable-focus lens 2 such that the focal length of variable-focus lens 2 is greater than 450 mm. For example, control means 4 sets the focal length of variable-focus lens 2 to 500 mm.

The processes shown in FIG. 6 may be executed when the image projection device is activated, or may be executed when a special button provided on the console of the image projection device is pressed. In addition, the processes of Steps S11-S14 may be repeated. In the distance calculation process of Step S13 in such repeated processing, reference is made to characteristic data that correspond to the focal length that was changed in preceding Step S14.

According to the image projection device of the present exemplary embodiment, the image projection device is set such that the user freely arranges projection surface 12, following which the processing shown in FIG. 6 is executed. In this way, the beam waist of the light beam from variable-focus lens 2 is reliably positioned more deeply than projection surface 12 whereby projection surface 12 can be scanned by convergent light. Accordingly, the effect of reducing speckle by means of convergent light can be obtained regardless of the position of arrangement of the projection surface.

For example, when the distance from scanning means 3 to projection surface 12 is within the range of from 100 mm to 1000 mm, a convergent light projection region in which speckle is reduced to a level in which speckle contrast is 13% can always be formed on projection surface 12.

Second Exemplary Embodiment

Figure 7:
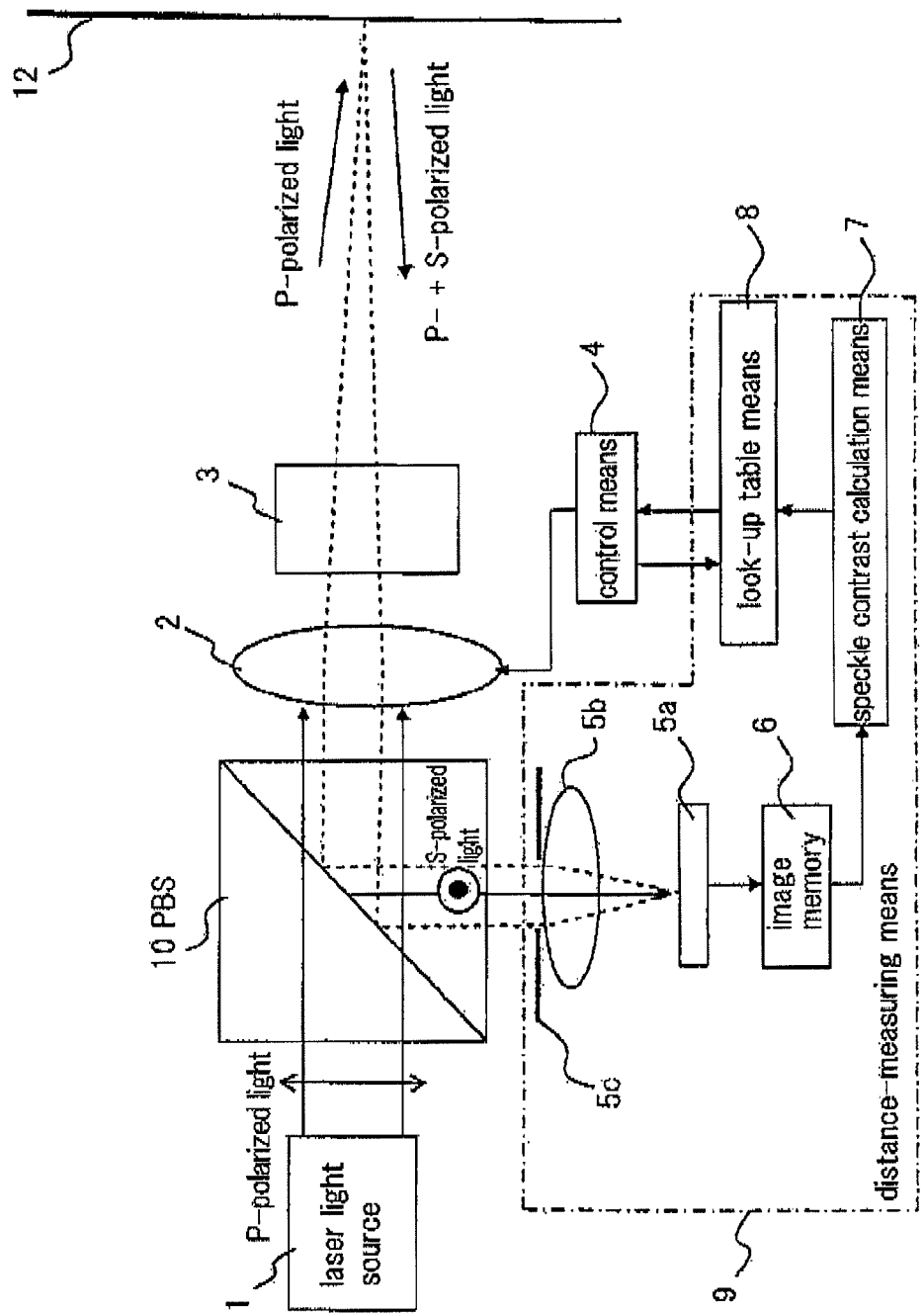
FIG. 7 is a schematic view showing the configuration of the principal parts of the image projection device that is the second exemplary embodiment of the present invention.

FIG. 7 is a schematic view showing the configuration of the principal parts of the image projection device that is the second exemplary embodiment of the present invention.

The image projection device of the present exemplary embodiment differs from the first exemplary embodiment in that the image-pickup means that constitutes distance-measuring means 9 is configured to capture an image of projection surface 12 by way of a polarization beam splitter (PBS) 10. The configuration is otherwise basically the same as the configuration of the first exemplary embodiment, and redundant explanation is therefore here omitted.

PBS 10 is provided along the direction of progression of the light beam (P-polarized light) from laser light source 1. The light beam (P-polarized light) from laser light source 1 is transmitted through PBS 10. Variable-focus lens 2 and scanning means 3 are arranged in that order along the direction of progression of the light beam (P-polarized light) that is transmitted through PBS 10.

When projection surface 12 is a diffusing surface, the reflected light from the portion that was irradiated by the light beam (P-polarized light) from scanning means 3 includes P-polarized light and S-polarized light. The reflected light (P-polarized light+S-polarized light) from projection surface 12 passes successively through scanning means 3 and variable-focus lens 2 and reaches PBS 10.

Of the reflected light from projection surface 12, the P-polarized light is transmitted through PBS 10, and the S-polarized light is reflected by PBS 10 in the direction of image-pickup lens 5b.

In the present exemplary embodiment, the image on projection surface 12 is formed on image sensor 5a by way of scanning means 3, variable-focus lens 2, PBS 10, and image-pickup lens 5b. The image data from image sensor 5a is supplied to speckle contrast calculation means 7 by way of image memory 6. Adjustment is then implemented by the processes shown in FIG. 6 such that the focal length of variable-focus lens 2 is greater than the distance from variable-focus lens 2 to projection surface 12.

As an example, a lens having a focal length of 4 mm and an f-number of 20 is used as image-pickup lens 5b. Diaphragm 5c is provided on the incident surface side of image-pickup lens 5b. The diameter of diaphragm 5c is, for example, 0.2 mm. In this case, the resolution limit for light of a wavelength of 532 nm is 13 μm. A 500 pixel×500 pixel CMOS sensor (5 μm pixel pitch) is used as image sensor 5b. Because the diameter of diaphragm 5c is 0.2 mm, the f-number as seen from the image-capture side is 5000 when the focal length of variable-focus lens 2 is 1000 mm. The focal depth in this case is ±800 mm, and image-pickup lens 5b is therefore able to maintain a focused state within a range of from 200 mm to 1800 mm. The capture of unfocused images that occurs as the focus of variable-focus lens 2 changes can therefore be suppressed.

In addition to the same action and effects exhibited by the first exemplary embodiment, the unification of the scanning system and image pickup system in the present exemplary embodiment enables a more compact image projection device.

Third Exemplary Embodiment

Figure 8:
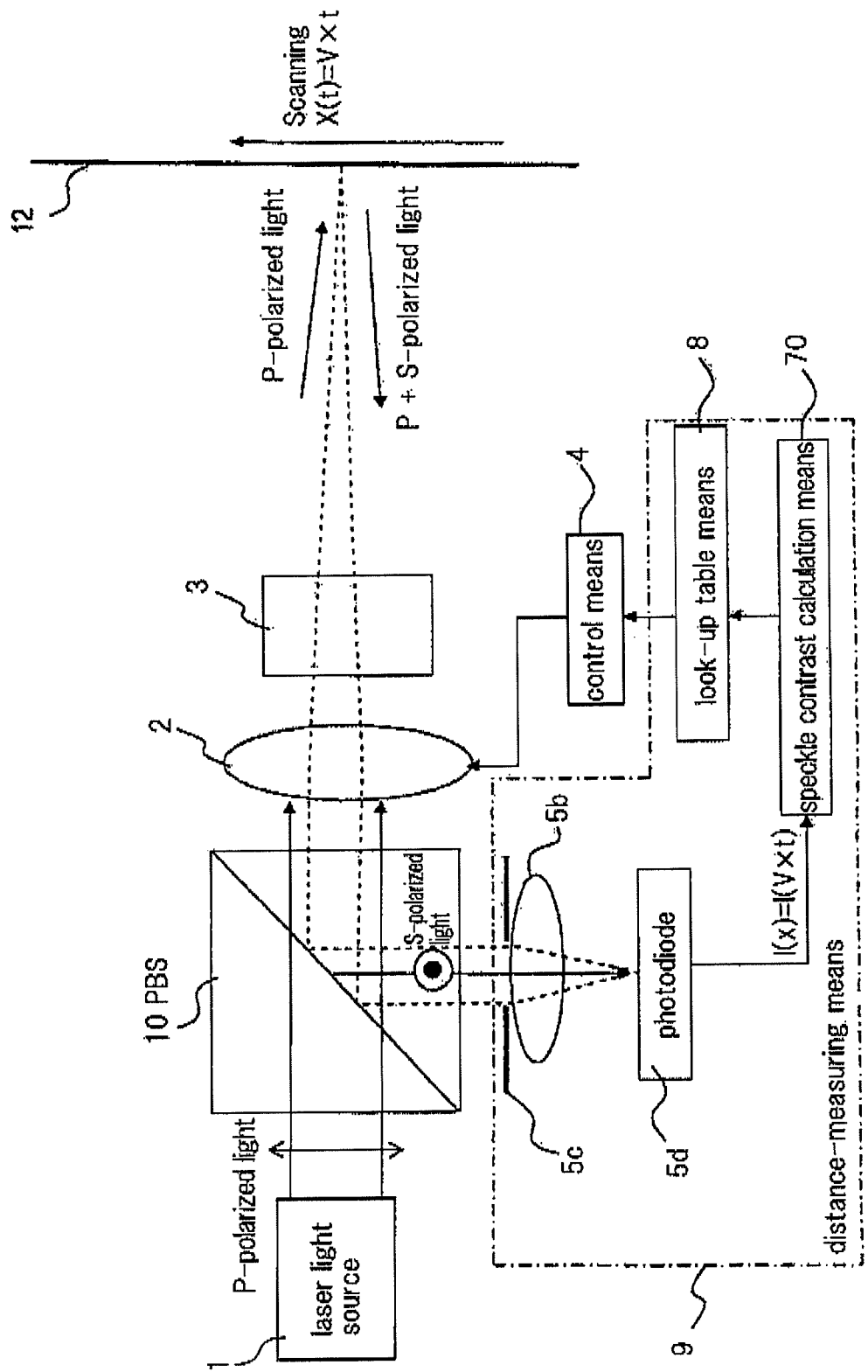
FIG. 8 is a schematic view showing the principal parts of the image projection device that is the third exemplary embodiment of the present invention.

FIG. 8 is a schematic view showing the configuration of the principal parts of the image projection device that is the third exemplary embodiment of the present invention.

The image projection device of the present exemplary embodiment differs from the second exemplary embodiment in that photodiode 5d, which is a photodetection means, and speckle contrast calculation means 70 are provided in place of image sensor 5a, image memory 6, and speckle contrast calculation means 7. The configuration is otherwise basically the same as the second exemplary embodiment, and redundant explanation is therefore here omitted.

Figure 9:
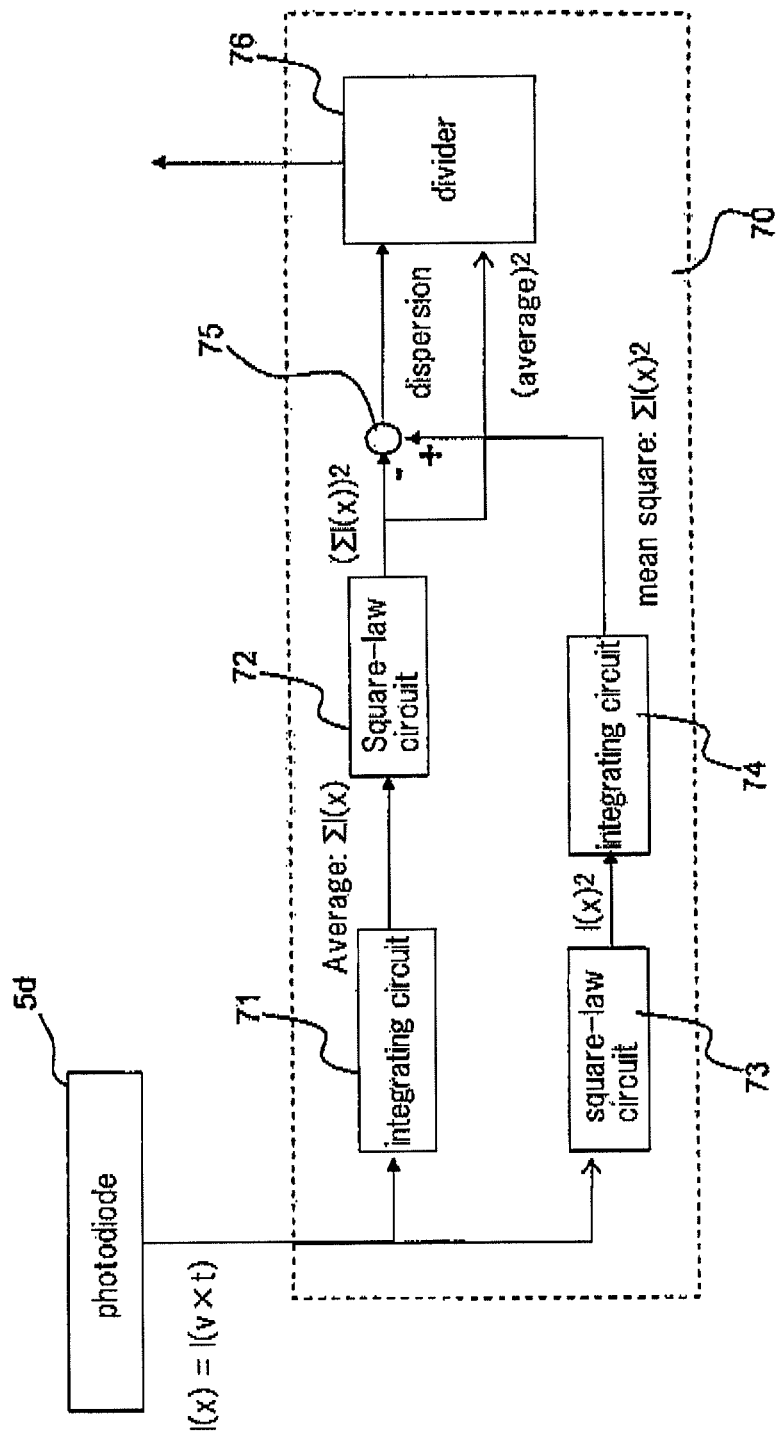
FIG. 9 is a block diagram showing the configuration of the speckle contrast calculation means of the image projection device shown in FIG. 8.

FIG. 9 shows the configuration of speckle contrast calculation means 70. Referring to FIG. 9, speckle contrast calculation means 70 includes integrating circuits 71 and 74, square-law circuits 72 and 73, subtractor 75, and divider 76.

The output signal I(x) of photodiode 5d is supplied to integrating circuit 71 and square-law circuit 73. Integrating circuit 71 calculates the value of average $\Sigma I(x)$ of the value I(x) that was supplied from photodiode 5d. Square-law circuit 73 squares the value of I(x) that is supplied from photodiode 5d. The output of integrating circuit 71 is supplied to square-law circuit 72 and the output of square-law circuit 73 is supplied to integrating circuit 74.

Square-law circuit 72 squares the value of average $\Sigma I(x)$ that was supplied from integrating circuit 71. Integrating circuit 74 calculates the value of average $\Sigma I(x)^2$ of the value $I(x)^2$ that was supplied from square-law circuit 73. The output $(\Sigma I(x))^2$ of square-law circuit 72 is supplied to the minus-side input of subtractor 75 and divider 76. The output $\Sigma I(x)^2$ of integrating circuit 74 is supplied to the plus-side input of subtractor 75.

Subtractor 75 supplies the value (dispersion) obtained by subtracting the value of $(\Sigma I(x))^2$ supplied from square-law circuit 72 from the value $\Sigma I(x)^2$ that was supplied from integrating circuit 74. The output (dispersion) of subtractor 75 is supplied to divider 76.

Divider 76 divides the value (dispersion) that was supplied from subtractor 75 by the value $(\Sigma I(x))^2$ that was supplied from square-law circuit 72. The calculation result corresponds to the value obtained by squaring speckle contrast. The output of divider 76 is supplied to look-up table means 8 of FIG. 8.

In look-up table means 8, the distance from variable-focus lens 2 to projection surface 12 is obtained based on the value obtained by taking the square root of the output value (the value obtained by squaring speckle contrast) of divider 76. Control means 4 controls variable-focus lens 2 such that the focal length of variable-focus lens 2 is greater than the distance (the distance from variable-focus lens 2 to projection surface 12) that was acquired in look-up table means 8.

The operation of the image projection device of the present exemplary embodiment is next described.

In the above-described first and second exemplary embodiments, speckle contrast was calculated based on image data from image sensors. The image projection device of the present exemplary embodiment differs from the first and second exemplary embodiments in that a value is calculated that is obtained by squaring speckle contrast based on the time-series signal of light intensity I(x) that is supplied from photodiode 5d. Processing other than calculation of speckle contrast is the same as the processing shown in FIG. 6.

The process of calculating speckle contrast is next described more concretely.

The beam position of projection surface 12 at time t is defined as x(t)=v×t (where v is the scanning rate). At time t, the light intensity I(x) detected by photodiode 5d corresponds to the image that is displayed on projection surface 12, and the time-series signal of this is I(v×t).

In the process of calculating speckle contrast, a first process realized by integrating circuit 71 and square-law circuit 72 and a second process realized by square-law circuit 73 and integrating circuit 74 are executed in parallel.

In the first process, the average value (average value per predetermined time interval) of the time-series intensity signal I(x) that was supplied from photodiode 5d is found, following which the value of the square of this value is found. In the second process, on the other hand, the value of the square of the time-series intensity signal I(x) that was supplied from photodiode 5d is found, following which the average value of this value (the average value per predetermined time interval) is found.

Next, the value (dispersion) of the square of the standard deviation of intensity signal I(x) is found from the difference between the result of the first process (the square of the average of I(x)) and the result of the second process (the average of the square of I(x)). The value of the square of speckle contrast is then found by dividing the value of the square of the standard deviation of intensity signal I(x) by the square of the average of intensity signal I(x).

In the above-described process of calculating speckle contrast, when the horizontal scanning time (the reciprocal of horizontal scanning frequency 15 kHz) is, for example, 66.6 μs, the integral action time of integrating circuits 71 and 74 is set to 33.3 μs (corresponding to the predetermined time interval in the above explanation). More specifically, the predetermined time interval is set to one-half the scanning time of one horizontal scanning line, whereby the speckle contrast of one horizontal scanning line can be calculated. In this case, the cut-off frequency of photodiode 5d is 40 MHz, and the clock for image display is at least a value that is twice 18.4 MHz.

The integral action time (predetermined time interval) is not limited to the above-described value. Any time may be set as the integrating time (predetermined time interval) as long as the speckle contrast can be calculated.

In the image projection device of the present exemplary embodiment, the speckle contrast calculation means may be realized by either an analog arithmetic circuit or a digital arithmetic circuit. In a digital arithmetic circuit, the output signal of photodiode 5d is sampled in an AD converter and the value of the square of the speckle contrast then found based on the sampled data.

In the image projection device of the present exemplary embodiment, as in the first and second exemplary embodiments, the beam waist of the light beam from variable-focus lens 2 is necessarily arranged at a position deeper than projection surface 12, whereby projection surface 12 can be scanned by convergent light. Accordingly, the effect of reducing speckle by means of convergent light can be obtained regardless of the position of arrangement of the projection surface.

Figure 10:
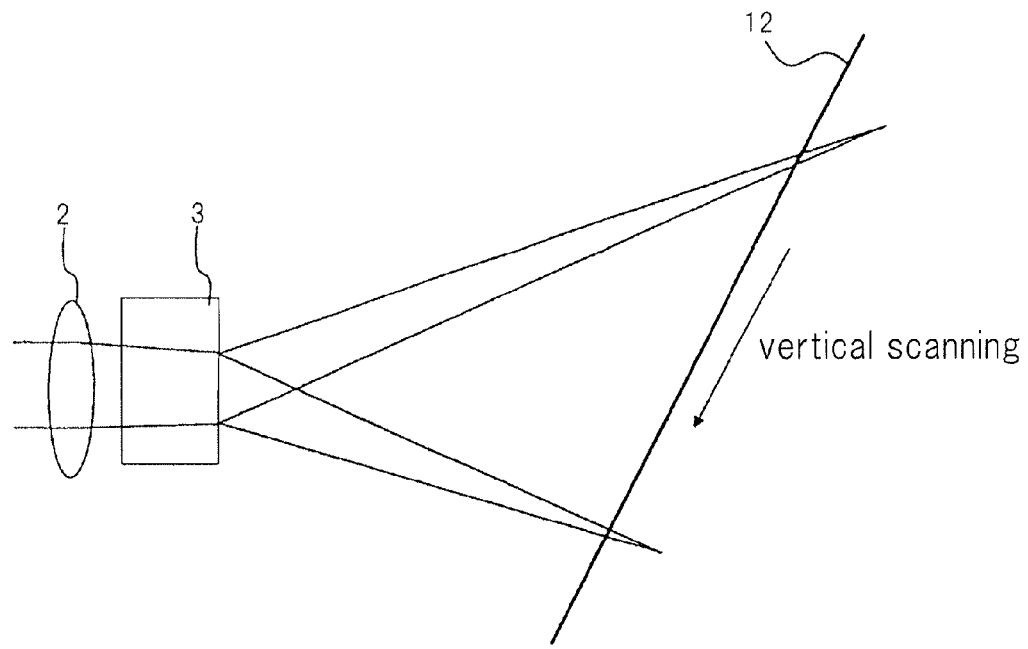
FIG. 10 is a schematic view showing the position of the beam waist of the light beam from the variable-focus lens in the image projection device shown in FIG. 8.

In addition, according to the image projection device of the present exemplary embodiment, the processing of Steps S11-S14 shown in FIG. 6 can be repeated, for example, for each horizontal scanning line, and as a result, the focal length of variable-focus lens 2 can be controlled according to the vertical scanning position (position of each horizontal scanning line). Accordingly, when an inclination of projection surface 12 with respect to the vertical direction occurs as shown in FIG. 10, control can be implemented such that the beam waist of the light beam from variable-focus lens 2 is necessarily positioned more deeply than projection surface 12 over the entire vertical scanning direction. The effect of reducing speckle by means of convergent light can therefore be obtained over the entire vertical scanning direction of the displayed image.

Still further, when a portion or the entirety of projection surface 12 is a curved surface, control can be implemented such that the beam waist of the light beam from variable-focus lens 2 is necessarily positioned more deeply than projection surface 12 over the entire vertical scanning direction. As a result, the effect of reducing speckle by means of convergent light can be obtained over the entire vertical scanning direction of the displayed image.

In each of the above-described exemplary embodiments, resolution decreases with an increase in the beam radius on projection surface 12. To suppress decrease of resolution, projection surface 12 is preferably arranged in the vicinity of the beam waist. More specifically, taking the beam waist as a reference, projection surface 12 is preferably arranged within a range (a range of distances in which the beam radius is a multiple of √2) that is prescribed by the Rayleigh length from the reference.

To suppress a decrease in resolution, control means 4 holds information corresponding to Rayleigh lengths that show the correspondence relation between the focal length of variable-focus lens 2 and the Rayleigh length, and at the time of altering the focal length in Step S14 shown in FIG. 6, may implement the processes described hereinbelow.

Control means 4 alters the focal length of variable-focus lens 2 such that the focal length of variable-focus lens 2 is greater than the distance acquired by look-up table means 8. In this alteration of the focal length, control means 4 refers to the Rayleigh length correspondence information and determines the focal length of variable-focus lens 2 such that the difference between the focal length following alteration and the distance acquired by look-up table means 8 are within a range prescribed by the Rayleigh length in the focal length after alteration.

In this way, the beam waist of the light beam from variable-focus lens 2 is necessarily positioned more deeply than projection surface 12, and moreover, projection surface 12 is positioned within a range of the Rayleigh length of the light beam. Accordingly, a displayed image having high resolution can be provided.

In particular, application of the control based on the above-described Rayleigh length in the image projection device of the third exemplary embodiment results in the beam waist being positioned more deeply than projection surface 12, and moreover, projection surface 12 being positioned within a range of the Rayleigh length of the light beam over the entire vertical scanning direction. Accordingly, an image having high resolution and that is focused can be obtained over the entire vertical scanning direction.

The image projection device of each of the above-described exemplary embodiments can also be applied to a configuration in which color images are displayed.

Figure 11:
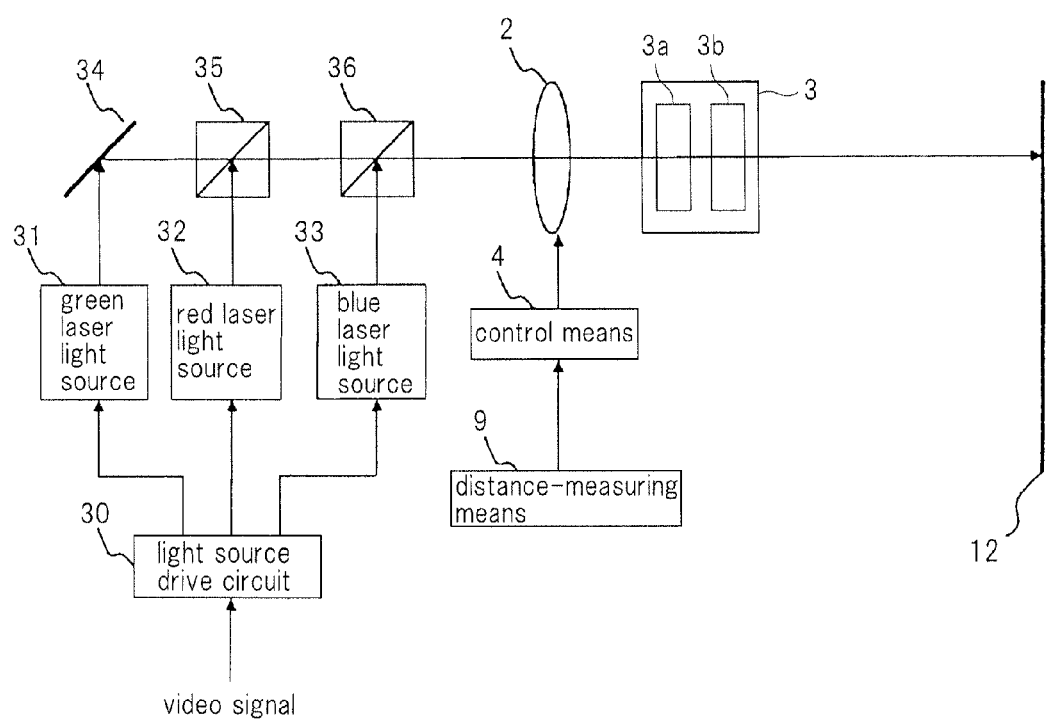
FIG. 11 is a block diagram showing the overall configuration of the image projection device that is another exemplary embodiment of the present invention.

FIG. 11 is a block diagram showing the overall configuration of an image projection device that is another exemplary embodiment of the present invention. Referring to FIG. 11, the image projection device includes: variable-focus lens 2, scanning means 3, control means 4, distance-measuring means 9, light source drive circuit 30, green laser light source 31, red laser light source 32, blue laser light source 33, reflecting mirror 34, and dichroic prisms 35 and 36. Variable-focus lens 2, scanning means 3, control means 4, and distance-measuring means 9 are all the same as the components in each of the above-described exemplary embodiments.

Light source drive circuit 30 generates each of a green laser modulation signal, a red laser modulation signal, and a blue laser modulation signal in accordance with an input video signal. The green laser modulation signal is supplied to green laser light source 31. The red laser modulation signal is supplied to red laser light source 32. The blue laser modulation signal is supplied to blue laser light source 33.

Figure 12:
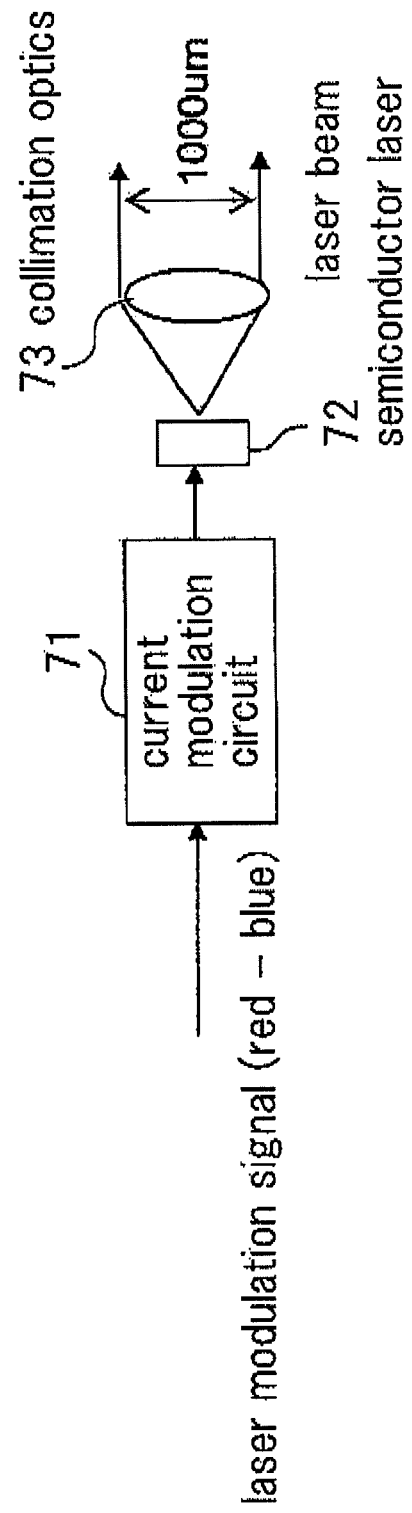
FIG. 12 is a block diagram showing the configuration of a red laser light source and blue laser light source that are used in the image projection device shown in FIG. 11.

FIG. 12 shows the configuration of the laser light source that is used as red laser light source 32 or blue laser light source 33.

The laser light source shown in FIG. 12 includes: current modulation circuit 71, semiconductor laser 72, and collimation optics 73. Current modulation circuit 71 controls the current that flows in semiconductor laser 72 in accordance with the laser modulation signal (red or blue) from light source drive circuit 30, whereby the intensity of output light of semiconductor laser 72 is modulated. The laser light from semiconductor laser 72 is converted to parallel luminous flux in collimation optics 73.

Red laser light source 32 is a component that employs a semiconductor laser having an emission wavelength 640 nm as semiconductor laser 72. Blue laser light source 33 is a component that employs a semiconductor laser having an emission wavelength of 440 nm.

FIG. 13A shows the configuration of green laser light source 31. The laser light source shown in FIG. 13A includes: drive circuit 74, infrared solid-state laser 75, second harmonic element 76, acousto-optical element 77, collimation optics 78, and condensing optics 79a and 79b.

Second harmonic element 76 supplies a second harmonic (532 nm) of infrared laser (1064 nm) that is irradiated from infrared solid-state laser 75 by way of condensing optics 79a.

The second harmonic beam from second harmonic element 76 is irradiated to acousto-optic element 77 by way of condensing optics 79b. Drive circuit 74 drives acousto-optical element 77 according to the laser modulation signal (for green) from light source drive circuit 30, whereby the intensity of the second harmonic beam from second harmonic element 76 is modulated. The beam from acousto-optical element 77 is converted to parallel luminous flux in collimation optics 78.

FIG. 13B shows another configuration of green laser light source 31. The laser light source shown in FIG. 13B includes current modulation circuit 80, infrared semiconductor laser 81, condensing optics 82, second harmonic element 83, and collimation optics 84.

Current modulation circuit 80 modulates the current that is supplied to infrared semiconductor laser 81 according to the laser modulation signal (for green) from light source drive circuit 10. The infrared laser from infrared semiconductor laser 81 is irradiated into second harmonic element 83 by way of condensing optics 82.

Second harmonic element 83 supplies a second harmonic of the irradiated infrared laser. The second harmonic beam from second harmonic element 83 is converted to parallel luminous flux in collimation optics 84.

Again referring to FIG. 11, reflecting mirror 34 is provided along the direction of progression of the laser light (green) from green laser light source 31, and dichroic prisms 35 and 36, variable-focus lens 2, and scanning means 3 are arranged in that order along the direction of progression of the laser light (green) that is reflected by this reflecting mirror 34.

Dichroic prism 35 is arranged at the intersection of laser light (green) from green laser light source 31 and laser light (red) from red laser light source 32. Dichroic prism 35 transmits laser light (green) from green laser light source 31 and reflects laser light (red) from red laser light source 32, whereby laser light (green) and laser light (red) are combined.

Dichroic prism 36 is arranged at the intersection of the combined-color beam (green+red) from dichroic prism 35 and laser light (blue) from laser light source 33. Dichroic prism 36 transmits the combined-color beam (green+red) from dichroic prism 35 and reflects the laser light (blue) from blue laser light source 33, whereby the beam (green+red) and the laser light (blue) are color-combined.

The combined-color beam (green+red+blue) from dichroic prism 36 is supplied to scanning means 3 by way of variable-focus lens 2.

Scanning means 3 includes a horizontal scanner and a vertical scanner. The horizontal scanner is composed of, for example, a resonant micro-mechanical scanning element. The resonant micro-mechanical scanning element is an element capable of reciprocating scanning. The deflection angle is ±20 degrees, and the drive frequency is 15 KHz. In order to enable driving at a drive frequency of 15 KHz in this case, a rectangular mirror having a diameter of 1400 μm is used as the resonant micro-mechanical scanning element.

The vertical scanner is made up of a galvanometer mirror. A galvanometer mirror has a deflection angle of, for example, ±15 degrees and is driven by a sawtooth wave of 60 Hz. The image definition is 640 pixels horizontally and 480 pixels vertically. The screen size is 290 cm horizontally and 220 cm vertically with a projection distance of 400 mm.

The laser light source is synchronized with scanning means 3, and emission timing-intensity is controlled at a time unit (for example, 6 ns) that is no greater than ⅛ a pixel clock of 18.4 MHz (54 ns).

The wavelength width of each of these light sources can be broadened by superposing a harmonic current of 300 MHz on the modulated currents of each of red laser light source 32 and blue laser light source 33. In this way, the speckle contrast produced by red laser light and blue laser light can be further reduced.

The above-described color image projection device is only an example, and the configuration can be altered as appropriate. For example, a dichroic prism, a fiber coupler, or various other optical multiplexing optics may be used in place of the dichroic mirror.

Each laser light source may be a fiber laser.

Various types of light modulators such as a grating MEMS modulator, a waveguide modulator, and an electro-optic crystal may be used as the laser intensity modulator.

An acousto-optic element or an electro-optic crystal may be used as the means for horizontal scanning and vertical scanning.

The beam deflecting part (such as a mirror) of the means for horizontal scanning and vertical scanning should be larger than the collimated beam radius. The size and shape of the beam deflecting part can be modified as appropriate as long as this condition is satisfied.

Each of the above-described exemplary embodiments are examples of the present invention, and the configuration of each exemplary embodiment can be modified as appropriate within a range that does not depart from the gist of the invention.

For example, although a distance-measuring means that calculates the distance from variable-focus lens 2 to projection surface 12 based on speckle contrast is used in the first to third exemplary embodiments, an existing distance-measuring means (range finding means) that uses triangulation may be used in place of this distance-measuring means.

This distance-measuring means (range finding means) includes: a light-emitting element, a projection lens that projects light from the light emitting element toward a projection surface, a light-receiving lens, and one-dimensionally arranged pickup elements. The light from the light-emitting element is reflected on the projection surface, and this reflected light is then supplied to the one-dimensionally arranged pickup elements by way of the light-receiving lens.

The image of the bright point that is formed on the projection surface by the light from the light-emitting element passes by way of the light-receiving lens and forms an image on the one-dimensionally arranged pickup elements. The distance from the variable-focus lens to the projection surface can be found by the principles of triangulation from the position of the image of the bright point on the one-dimensionally arranged pickup elements.

When projection surface 12 is scanned by a light beam, distortion may occur in the displayed image due to the inclination or curved state of projection surface 12. To suppress this image distortion, the image projection device of the third exemplary embodiment may be configured as described below.

The distance from variable-focus lens 2 to projection surface 12 is calculated with each horizontal scan line, and the inclination or curvature of projection surface 12 in the vertical direction can therefore be examined based on the calculation result of each of these distances. The video signal may be subjected to a process for correcting the above-described image distortion according to the inclination or curvature of projection surface 12. More specifically, distance-measuring means 9 supplies the distance that is calculated for each horizontal scan line to a modulation signal generation means (for example, the light source drive circuit shown in FIG. 11). The modulation signal generation means judges the inclination or curvature of projection surface 12 in the vertical direction based on the distance information of each horizontal scan line that was supplied from distance-measuring means 9. The modulation signal generation means subjects the input video signal to a process for correcting image distortion according to the inclination or curvature of projection surface 12 that was judged. The modulation signal generation means then generates a modulation signal for modulating the laser light source based on the video signal that has undergone this image distortion correction.

In the image projection device of the first exemplary embodiment, distance-measuring means 9 may also be configured as shown in FIG. 7.

The images that are projected or displayed on the projection surface in each of the exemplary embodiments include images that can be projected or displayed on a projection surface based not only image data such as pictures or photographs but also electronic data such as characters, diagrams, and tables.

In the image projection device of each of the exemplary embodiments, a process may be carried out for creating characteristic data after activation. More specifically, when a predetermined input operation (such as pressing a particular button) is carried out in the image projection device shown in FIG. 3, control means 4 causes stepped changes of the focal length of variable-focus lens 2, and speckle contrast calculation means 7 calculates the speckle contrast value based on each of the focal lengths. Still further, based on the calculation results, speckle contrast calculation means 7 creates characteristic data that indicate the change in speckle contrast with respect to change of the distance to projection surface 12 from the position of the beam waist of the light beam that is condensed by variable-focus lens 2 and saves the created characteristic data in look-up table means 8. By thus saving characteristic data relating to actual projection surface 12 in look-up table means 8, the distance to projection surface 12 from the position of the beam waist of the light beam condensed by variable-focus lens 2 can be more accurately calculated. The characteristic data can be repeatedly used as long as the object that is projection surface 12 does not change to another object.

In addition, speckle contrast varies according to the state (uneven state) of projection surface 12, and the characteristic data therefore may also be created for each type of object that is set as projection surface 12. In this case, an input operation must be carried out to select the characteristic data in the distance-measuring device after activation.

When the particular object that is the object set as projection surface 12 is limited to, for example, a screen for image projection, the characteristic data relating to this screen may be saved in advance in look-up table means 8.

In addition to a raster-scanning device, the present invention can also be applied to a vector-scanning device.

In each of the exemplary embodiments, the means (distance-measuring device and distance measuring method) for calculating the distance from variable-focus lens 2 to projection surface 12 based on speckle contrast is an element of the main configuration that realizes the image projection device of the present invention, and this element itself provides a novel configuration.

In the distance-measuring device, a laser light source is the illumination means of the object (surface) of detection and the distance of the object (surface) of detection is measured based on look-up table means.

One aspect of the distance measuring device includes: a variable-focus lens in which the focal length can be changed; scanning means that scans a detection object surface by means of a light beam that is condensed by the above-described variable-focus lens; image-pickup means that picks up the detection object surface that was scanned by the above-described light beam; speckle contrast calculation means that, based on image data from the above-described image-pickup means, calculates speckle contrast that indicates the degree of speckle produced in the above-described detection object surface; and look-up table means that, for each of a plurality of different focal lengths to which the above-described variable-focus lens is set, saves characteristic data that indicate changes of the above-described speckle contrast with respect to changes of the distance to the above-described detection object surface from the position of the beam waist of the light beam that is condensed by the above-described variable-focus lens, that refers to the saved characteristic data, and that, based on the focal length of the above-described variable-focus lens that was set at the time of image pickup by the above-described image-pickup means and the value of the speckle contrast that was calculated in the above-described speckle contrast calculation means, acquires the distance from the above-described variable-focus lens to the above-described detection object surface.

In addition, according to a procedure of the distance measuring method: a detection object surface is scanned by a light beam that is condensed by a variable-focus lens in which focal length can be changed and the detection object surface that was scanned by the light beam is picked up; based on image data obtained by the above-described image pickup, speckle contrast that indicates the degree of speckle produced on the above-described detection object surface is calculated; reference is made to a table that saves characteristic data that indicate, for each of a plurality of different focal lengths to which the above-described variable-focus lens is set, changes in the above-described speckle contrast with respect to changes in the distance to the above-described detection object surface from the position of the beam waist of the light beam that was condensed by the above-described variable-focus lens; and based on the focal length of the above-described variable-focus lens that was set at the time of the above-described image pickup and the value of the above-described speckle contrast that was calculated, the distance from the above-described variable-focus lens to the above-described detection object surface is calculated.

Although the present invention has been described with reference to exemplary embodiments, the present invention is not limited to the above-described exemplary embodiments. The configuration and operation of the present invention is open to various modifications within a scope that does not depart from the gist of the present invention that will be understood by one of ordinary skill in the art.

This application claims the benefits of priority based on Japanese Patent Application No. 2009-238087 for which application was submitted on Oct. 15, 2009 and incorporates by citation all of the disclosures of that application.

What is claimed is:
1. A projection device comprising:
a variable-focus lens in which focal length can be changed;
a distance-measuring unit that measures the distance from said variable-focus lens to a projection surface to which a light beam that is condensed by said variable-focus lens is irradiated; and
a control unit that controls said variable-focus lens such that the focal length of said variable-focus lens is greater than the distance measured by said distance-measuring unit.

2. The projection device as set forth in claim 1, further comprising:
a scanning unit that scans the projection surface by means of the light beam that is condensed by said variable-focus lens.

3. The projection device as set forth in claim 2, wherein said distance-measuring unit comprises:
a image-pickup unit that captures a displayed image that is displayed on said projection surface by means of the light beam from said scanning unit;
a speckle contrast calculation unit that, based on image data from said image-pickup unit, calculates speckle contrast that indicates the degree of speckle produced at said projection surface; and
a look-up table unit that saves characteristic data that indicate, for each of a plurality of different focal lengths to which said variable-focus lens is set, changes of said speckle contrast with respect to changes of the distance to said projection surface from the position of the beam waist of the light beam that is condensed by said variable-focus lens; that refers to the saved characteristic data; and that obtains the distance from said variable-focus lens to said projection surface based on the focal length of said variable-focus lens that was set at the time of image pickup by said image-pickup unit and the value of speckle contrast that was calculated in said speckle contrast calculation unit.

4. The projection device as set forth in claim 3, wherein said speckle contrast calculation unit comprises:
a image average calculation unit that calculates the average value of the values of each pixel of said displayed image based on image data from said image-pickup unit;
image standard deviation calculation unit that calculates the standard deviation of the values of each of said pixels based on image data from said image-pickup unit; and
a dividing unit that supplies as said speckle contrast a value obtained by dividing the value of the standard deviation calculated in said image standard deviation calculation unit by the average value that was calculated in said image average calculation unit.

5. The projection device as set forth in claim 3, further comprising:
a polarization beam splitter that transmits light of a first polarization component and that reflects light of a second polarization component that differs from said first polarization component; and
a laser light source that supplies a light beam of said first polarization component by way of said polarization beam splitter to said variable-focus lens;
wherein said polarization beam splitter reflects, of the light beam irradiated from said variable-focus lens, light of said second polarization component toward said image-pickup unit.

6. The projection device as set forth in claim 2, wherein said distance-measuring unit includes:
a photodetection unit that detects reflected light resulting from the reflection of the light beam from said scanning unit by said projection surface and that supplies a time-series intensity signal that indicates change in the intensity of the reflected light;
a speckle contrast calculation unit that, based on the time-series intensity signal supplied from said photodetection unit, calculates speckle contrast that indicates the degree of speckle produced at said projection surface; and
a look-up table unit that saves characteristic data that indicate, for each of a plurality of different focal lengths to which said variable-focus lens is set, changes of said speckle contrast with respect to changes of the distance to said projection surface from the position of the beam waist of the light beam that is condensed by said variable-focus lens; that refers to the saved characteristic data; and that obtains the distance from said variable-focus lens to said projection surface based on the focal length of said variable-focus lens that was set at the time of detection of reflected light by said photodetection unit and the value of speckle contrast that was calculated in said speckle contrast calculation unit.

7. The projection device as set forth in claim 6, wherein said speckle contrast calculation unit comprises:
a first square-law circuit that squares the value of the time-series intensity signal from said photodetection unit;
a first integrating circuit that calculates the average value per predetermined time interval of the output signal of said first square-law circuit;
a second integrating circuit that calculates the average value per said predetermined time interval of the time-series intensity signal from said photodetection unit;
a second square-law circuit that squares the value of the output signal of said second integrating circuit;
a subtraction circuit that subtracts the value of the square of the time average of said time-series intensity signal that is supplied from said second square-law circuit from the value of the time average of the square of said time-series intensity signal that is supplied from said first integrating circuit; and
a divider that supplies, as the value of the square of said speckle contrast, a value obtained by dividing the output value of said subtraction circuit by the value of the square of the time average of said time-series intensity signal that is supplied from said second square-law circuit.

8. The projection device as set forth in claim 6, further comprising:
a polarization beam splitter that transmits light of a first polarization component and that reflects light of a second polarization component that differs from said first polarization component; and
a laser light source that supplies to said variable-focus lens a light beam of said first polarization component by way of said polarization beam splitter;
wherein said polarization beam splitter reflects, of the light beam that is irradiated from said variable-focus lens, light of said second polarization component toward said photodetection unit.

9. The projection device as set forth in claim 6, wherein said scanning unit comprises:
a first scanning unit that scans the light beam from said variable-focus lens along a first direction; and
a second scanning unit that scans the light beam from said first scanning unit along a second direction that intersects with said first direction;
wherein said predetermined time interval is one-half the scanning time of one scan line of said first direction by said first scanning unit.

10. The projection device as set forth in claim 1, wherein said control unit: saves Rayleigh length correspondence information that indicates the correspondence relation between the focal length of said variable-focus lens and Rayleigh lengths; refers to said Rayleigh length correspondence information when changing the focal length of said variable-focus lens; and determines the focal length of said variable-focus lens such that the difference between the focal length after change and the distance acquired by said distance-measuring unit is within a range prescribed by the Rayleigh length in the focal length after this change.

11. The projection device as set forth in claim 1, further comprising:
   a light source;
   wherein said variable-focus lens condenses a light beam from said light source.

12. The projection device as set forth in claim 1, further comprising:
   a Light source drive circuit that generates a modulation signal in accordance with an input video signal; and
   a light source to which the modulation signal is supplied from said Light source drive circuit and that outputs a light beam that is modulated based on the modulation signal;
   wherein said variable-focus lens condenses the light beam from said light source.

13. An image projection method for displaying an image by scanning a projection surface by a light beam, that is condensed by a variable-focus lens in which the focal length can be changed, comprising:
   measuring the distance from said variable-focus lens to said projection surface and setting in the variable-focus lens a focal length that is greater than the distance that was measured.

14. A distance-measuring device comprising:
   a variable-focus lens in which the focal length can be changed;
   a scanning unit that scans a detection object surface by means of a light beam that is condensed by said variable-focus lens;
   a image-pickup unit that picks up a detection object surface that was scanned by said light beam;
   a speckle contrast calculation unit that, based on image data from said image-pickup unit, calculates speckle contrast that indicates the degree of speckle produced at said detection object surface; and
   a look-up table unit that, for each of a plurality of different focal lengths to which said variable-focus lens is set, saves characteristic data that indicate changes of said speckle contrast with respect to changes of the distance to said detection object surface from the position of the beam waist of the light beam that is condensed by said variable-focus lens, that refers to the saved characteristic data, and that, based on the focal length of said variable-focus lens that was set at the time of image pickup by said image-pickup unit and the value of the speckle contrast that was calculated in said speckle contrast calculation unit, acquires the distance from said variable-focus lens to said detection object surface.

15. The distance-measuring device as set forth in claim 14, further comprising:
   a light source;
   wherein said variable-focus lens condenses a light beam from said light source.

16. A distance measuring method comprising:
   scanning a detection surface by a light beam that is condensed by a variable focus lens in which focal length can be changed to capture an image of the detection surface that is scanned by the light beam;
   based on image data obtained by capturing said image, calculating speckle contrast that indicates the degree of speckle produced at said detection surface; and
   referring to a table in which are saved characteristic data that indicate, for each of a plurality of different focal lengths to which said variable-focus lens is set, changes of said speckle contrast with respect to changes of the distance to said detection surface from the position of the beam waist of the light beam that is condensed by said variable-focus lens and calculating the distance from said variable-focus lens to said detection surface based on the focal length of said variable-focus lens that was set at the time of said image pickup and the value of said speckle contrast that was calculated.

* * * * *